A. SHEDLOCK.
ELECTRO-MAGNETIC MOTORS.
No. 193,385. Patented July 24, 1877.
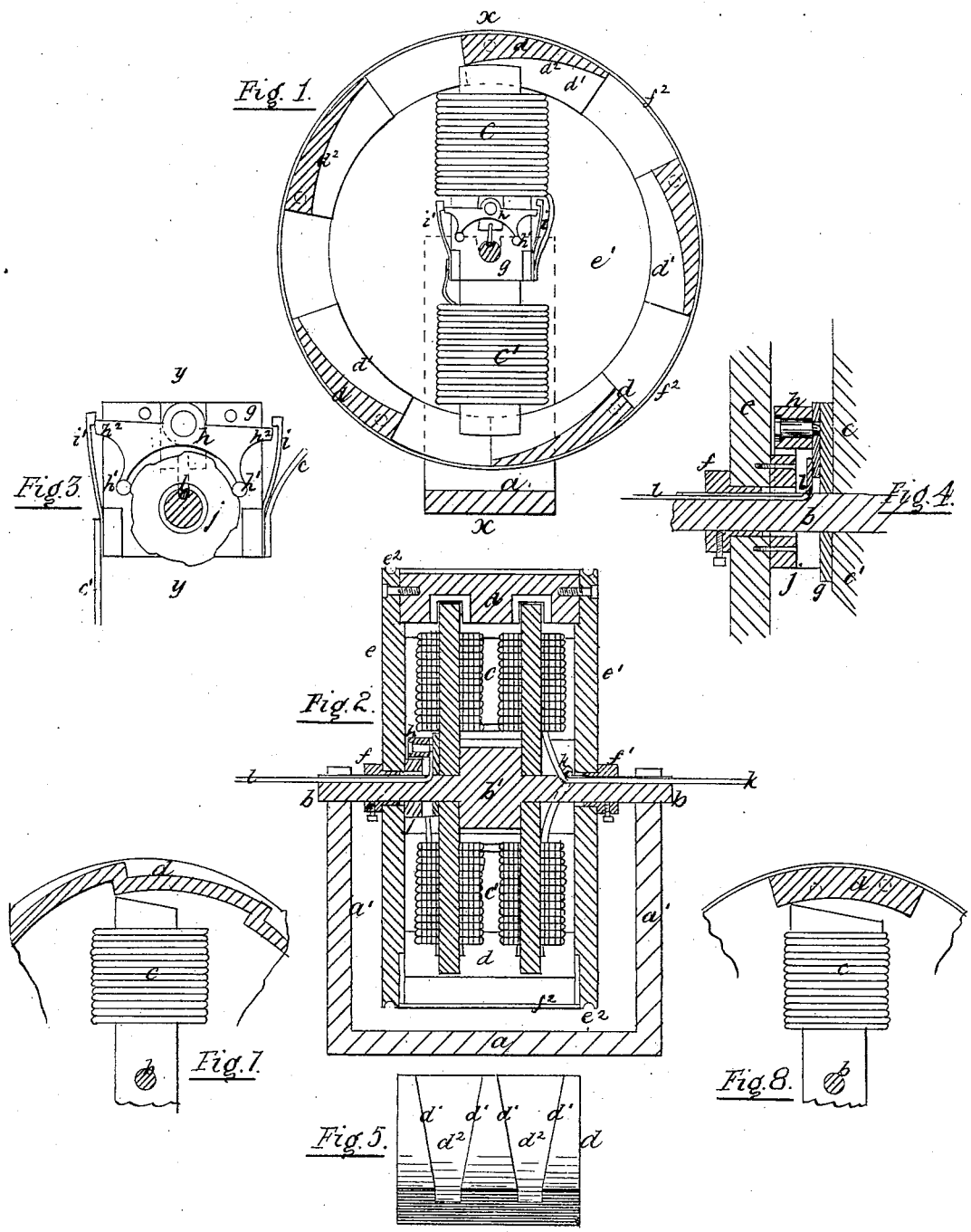
Witnesses
E. H. Johnson.
Danl. Brown.
Alfred Shedlock
Inventor.

UNITED STATES PATENT OFFICE.

ALFRED SHEDLOCK, OF NEW YORK, N. Y., ASSIGNOR OF ONE-HALF HIS RIGHT TO JAMES FRASER AND WILLIAM M. REYNOLDS, OF SAME PLACE.

IMPROVEMENT IN ELECTRO-MAGNETIC MOTORS.

Specification forming part of Letters Patent No. 193,385, dated July 24, 1877; application filed November 10, 1876.

*To all whom it may concern:*

Be it known that I, ALFRED SHEDLOCK, of the city of New York, county and State of New York, have invented certain Improvements in Electro-Magnetic Motors, of which the following is a specification:

This invention relates to improvements in electro-magnetic motors; and consists in so forming the adjacent surfaces of the magnets and armatures that they are inclined to each other; and also in an improved rheotome. The magnets are secured to a hub on a stationary shaft, and the armatures to two disks bearing on the shaft—one on either side of the magnets—so the armatures in revolving just clear the poles of the magnets. The surfaces of the armatures and poles of the magnets in juxtaposition are inclined one to another, and the attractive force of the magnets being greater toward the apex of the angle formed by these inclined surfaces than at the open ends, the armatures are moved over the poles of the magnets with a force equal to the difference of such attractions. I am enabled by this arrangement to construct an electro-magnetic motor with only two magnets without any dead-centers, for the armatures are a very short distance from the magnets when they are in position to be attracted by them, and when one of magnets has moved an armature to its fullest extent the other magnet is in position to attract another armature, there being an odd number of armatures equally spaced around the disks, and the magnets diametrically placed, so that one of the armatures is always in position to be attracted by one of the magnets; and by making the inclined surfaces of a proper angle the power exerted by the magnets to move the armature-wheel is always constant, so there is no dead-center.

The improvement in rheotomes consists of a light frame working on an insulated pivot, so as to oscillate between two fixed insulated pieces of metal, to which one end of the wire coils of each magnet is attached, the other ends of the coils being connected to one of the wires from the battery, and the other wire from the battery is attached to the frame, which is oscillated by a notched wheel bearing against two rounded projections from it, said wheel being secured to one of the disks carrying the armatures, so that the magnets are alternately brought within the electric circuit by the frame coming in contact with the fixed pieces of metal alternately.

But to describe my invention more particularly, I will refer to the accompanying drawings, forming part of this specification, in which—

Figure 1 is a side elevation, with the armatures and frame supporting the fixed shaft shown in section. Fig. 2 is a section, cut through the line $x$ $x$ of Fig. 1. Fig. 3 is an enlarged detached front view of the rheotome. Fig. 4 is a sectional view of the same, through the line $y$ $y$. Fig. 5 is a detached view of one of the armatures from beneath. Fig. 6 is an end view of the same. Figs. 7 and 8 show modifications of the armatures and magnets.

$a$ represents the frame of the motor, with the two upright parts $a'$ $a'$, which support the shaft $b$. The shaft $b$ is provided with the central hub $b'$, to which the magnets $c$ and $c'$ are secured. The poles of the magnets projects some distance beyond the coils, and pass through channels in the armatures $d$ $d$. As shown at Figs. 1 and 2 the sides $d^1$ $d^1$ of the channels are tapering, as are also the bottoms $d^2$ $d^2$, as clearly shown at Figs. 5 and 6. There are five armatures shown in the drawings, but the number may be varied according to the size of the motor and the number of magnets used. The armatures $d$ $d$ are secured between two disks, $e$ $e^1$, which revolve on sleeves $f$ $f^1$ on the shaft $b$. These sleeves are secured to the shaft by means of set-screws, so that as the bearings get loose from wear the sleeves may be set up closer to the disk, so as to take up the slack. It would be advantageous in some cases to make the disks $e$ $e^1$ of wood. In such cases they would be bushed with metal bearings. On the outside of the armature is placed the shield or covering $f^2$ of wood-veneer or other suitable material, thus covering up the whole of the working parts, as the rheotome is between the magnets and one of the disks, besides giving the motor a very finished appearance, as the motor, when running, appears as a smooth drum revolving on a fixed shaft. Grooves $e^2$ $e^2$ are formed in the peripheries of the disks, or smaller grooves formed on their sides to connect it to the machine it is driving.

The plate $g$, made of some suitable non-conducting material, is secured to the sides of the magnets or to the shaft $b$. On it is pivoted the metal frame $h$, which is provided with two rounded projections, $h^1$ $h^1$. Said projections are in contact with the notched wheel $j$, which is secured to and revolves with the disk $e^1$. The wheel $j$ has as many notches as there are armatures; so the frame $h$ makes the same number of oscillations. On the plate $g$, on either side of the frame $h$, are secured the pieces of metal $i$ $i'$, which are adjusted so that either one or the other of them is in contact with the arms $h^2$ $h^2$ of the frame $h$. To the piece $i$ is connected one end of the coil of the magnet $c$, and to the other piece, $i'$, one end the coil of the magnet $c'$. The other ends of the coils are connected to the conductor $k$, which lies in a groove cut in the shaft $b$, as shown at Fig. 2. The other conductor $l$ from the battery passes along a groove cut in the other end of the shaft $b$, and is connected to the pivot on which the frame $h$ works, so that upon the oscillation of the frame $h$, and consequent alternate contact of the frame with the pieces $i$ and $i'$, the electric current is alternately passed through the coils of the magnets $c$ and $c'$.

Fig. 7 shows a modification of the armatures and magnets, in which both the poles of the magnets and armatures are inclined one to another. The armatures are also shown as one continuous piece of iron, with inclined inside depressions.

Fig. 8 shows a modification, in which the poles of the magnets alone are inclined, the armatures being concentric with the shaft. The magnet-poles in this case are enlarged sidewise, so as to cover the whole of the flat surfaces of the armatures. The channels in the armatures of this and the preceding modification are done away with.

I claim—

1. An electro-magnetic motor, in which the surfaces of the magnets and armatures, when in juxtaposition, are inclined one to another, in the manner substantially as set forth.

2. The armature $d$, constructed with the inclined surfaces $d^1$ $d^1$ and $d^2$, so as to be acted upon by the three surfaces of the poles of the magnets, substantially as set forth.

3. The commutator described, consisting of the cam or notched wheel $j$, swinging frame $h$, having projecting portions $h^2$ $h^2$ and $h^1$ $h^1$, and springs $i$ and $i'$, substantially as and for the purpose described.

ALFRED SHEDLOCK.

Witnesses:
E. H. JOHNSON,
DANL. BROWN.